US010574938B1

(12) United States Patent
Trail

(10) Patent No.: US 10,574,938 B1
(45) Date of Patent: Feb. 25, 2020

(54) VARIABLE FRAME RATE DEPTH CAMERA ASSEMBLY

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 140 days.

(21) Appl. No.: 15/634,077

(22) Filed: Jun. 27, 2017

(51) Int. Cl.
H04N 7/01 (2006.01)
H04N 5/345 (2011.01)
H04N 5/378 (2011.01)
G06T 7/521 (2017.01)
G06T 7/55 (2017.01)

(52) U.S. Cl.
CPC .......... H04N 7/0127 (2013.01); G06T 7/521 (2017.01); G06T 7/55 (2017.01); H04N 5/345 (2013.01); H04N 5/378 (2013.01); G06T 2207/10028 (2013.01)

(58) Field of Classification Search
CPC ...... H04N 7/0127; H04N 5/345; H04N 5/378; G06T 7/55; G06T 7/521; G06T 2207/10028
USPC ........................................................ 348/135
See application file for complete search history.

(56) References Cited

U.S. PATENT DOCUMENTS

| 2011/0018881 | A1* | 1/2011 | Nash ....................... G06T 13/00 345/473 |
| 2011/0139873 | A1* | 6/2011 | Sprenger .............. G01D 5/2492 235/436 |
| 2012/0314085 | A1* | 12/2012 | Gohshi .................. H04N 5/913 348/164 |
| 2013/0293688 | A1* | 11/2013 | Benson ................ G02B 27/017 348/53 |
| 2015/0146852 | A1* | 5/2015 | Sung ........................ H04N 5/32 378/62 |
| 2016/0100127 | A1* | 4/2016 | Choi ...................... H04N 7/013 348/441 |
| 2017/0123041 | A1* | 5/2017 | Bae ........................... G01S 3/02 |
| 2017/0374272 | A1* | 12/2017 | Tsuji ........................ G06T 7/11 |

* cited by examiner

Primary Examiner — James T Boylan
(74) Attorney, Agent, or Firm — Fenwick & West LLP

(57) ABSTRACT

A depth camera assembly (DCA) for depth sensing of a local area. The DCA includes a light generator, a detector, and a controller. The light generator illuminates a local area with a light pattern. The detector captures portions of the light pattern reflected from an object in the local area. The detector includes pixel rows and pixel columns that form a dynamically adjustable read-out area. The controller reads first data of the captured portions of the reflected light pattern that correspond to a first read-out area, and locates the object based on the first data. The controller determines a second read-out area of the detector based on a portion of the read-out area associated with the object. The controller reads second data of the captured portions of the reflected light pattern that correspond to the second read-out area, and determines depth information for the object based on the second data.

19 Claims, 4 Drawing Sheets

VARIABLE FRAME RATE DEPTH CAMERA ASSEMBLY

BACKGROUND

The present disclosure generally relates to depth sensing, and specifically relates to a depth camera assembly with a variable frame rate.

In a conventional tracking system, full frames of images acquired by a sensor or a group of sensors (whether a scene or a field-of-view is covered by one or more sensors) are read out from the sensor(s) at some defined rate. The read-out of full frames in the conventional tracking system is irrespective of a distance of a tracking object from the sensor(s) or a relative image size of the tracking object. This full read-out approach is inefficient in terms of frame bandwidth between the sensor(s) and a controller that performs processing of the acquired frames. Also, power dissipation at the sensor(s) and the controller can be prohibitively high due to a large amount of data continuously being acquired by the sensor(s) and processed by the controller. Furthermore, the tracking performance of the full read-out approach can deteriorate as the rate of reading the frames does not change with respect to a distance to an object being tracked—which leads to higher noise and uncertainty in localized coordinates of the object(s) of interest.

SUMMARY

A depth camera assembly (DCA) that tracks an object in a local area surrounding some or all of the DCA and determines depth information for the object. The DCA includes a light generator, an imaging device, and a controller coupled to the imaging device. The light generator is configured to illuminate a local area with a light pattern. The imaging device includes a detector. The detector is configured to capture portions of the light pattern reflected from an object in the local area. The detector includes a plurality of pixel rows and a plurality of pixel columns that form a dynamically adjustable read-out area.

The controller reads, from the detector at a first rate, first data of the captured portions of the reflected light pattern that correspond to a first read-out area of the detector. The controller locates the object in the local area based on the first data. The object is associated with a portion of the read-out area of the detector, and a size of the portion of the read-out area is inversely proportional to a distance between the object and the detector. The object can be considered to be of a relatively constant size, such as the size of an adult human. The controller determines a second read-out area of the detector based on the size of the portion of the read-out area associated with the object. In some embodiments, the controller determines a second rate to read data from the detector based in part on the size of the portion of the read-out area associated with the object relative to a threshold size. The controller reads, from the detector at the second rate, second data of the captured portions of the reflected light pattern that correspond to the determined second read-out area. The controller determines depth information for the object based on the second data.

The DCA can be part of a station separate from a head-mounted display (HMD). The station may be a console or some other device interfaced (through a wired or wireless connection) with the HMD. The station may be part of, e.g., a virtual reality (VR) system, an augmented reality (AR) system, a mixed reality (MR) system, or some combination thereof. The station can perform tracking and depth sensing of one or more objects in an environment surrounding some or all of the station including a user wearing the HMD. The station may provide the depth information to the HMD, e.g., for presentation to the user, or as transmitted for storage, evaluation or presentation to external users.

The HMD can further integrate the DCA. The HMD further includes an electronic display and an optical assembly. The HMD may be, e.g., a VR system, an AR system, a MR system, or some combination thereof. The electronic display is configured to emit image light. The optical assembly is configured to direct the image light to an exit pupil of the HMD corresponding to a location of a user's eye, the image light comprising the depth information of one or more objects in the local area determined by the DCA.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A depth camera assembly (DCA) includes an imaging device and a controller. The imaging device images (e.g., via a detector) one or more objects in a local area surrounding some or all of the DCA. In some embodiments, the imaging device images active locators on head-mounted displays (HMDs). The DCA identifies an object of interest (e.g., a HMD) in the local area, and dynamically adjusts a size of a read-out area of the detector to match the object of interest. Furthermore, the DCA upscales (or downscales) a frame rate from the detector with a change in size of the read-out area of the detector and an amount of data transmitted from the detector to the controller.

In some embodiments, the DCA is integrated into a station separate from a HMD. The station may be a console or some other device interfaced (through a wired or wireless connection) with a HMD. The station may be part of, e.g., a virtual reality (VR) system, an augmented reality (AR) system, a mixed reality (MR) system, or some combination thereof. The station can perform tracking and depth sensing of an object of interest including a user wearing the HMD. The station may provide information about a three-dimensional model (depth information) of the object to the HMD, e.g., for presentation to the user.

In alternate embodiments, the DCA is integrated into a HMD that captures data describing depth information in a local area surrounding some or all of the HMD. The HMD may be part of, e.g., a VR system, an AR system, a MR system, or some combination thereof. The HMD further includes an electronic display and an optical assembly. The electronic display is configured to emit image light. The optical assembly is configured to direct the image light to an exit pupil of the HMD corresponding to a location of a user's eye, the image light comprising the depth information of one or more objects in the local area determined by the DCA.

Figure 1:
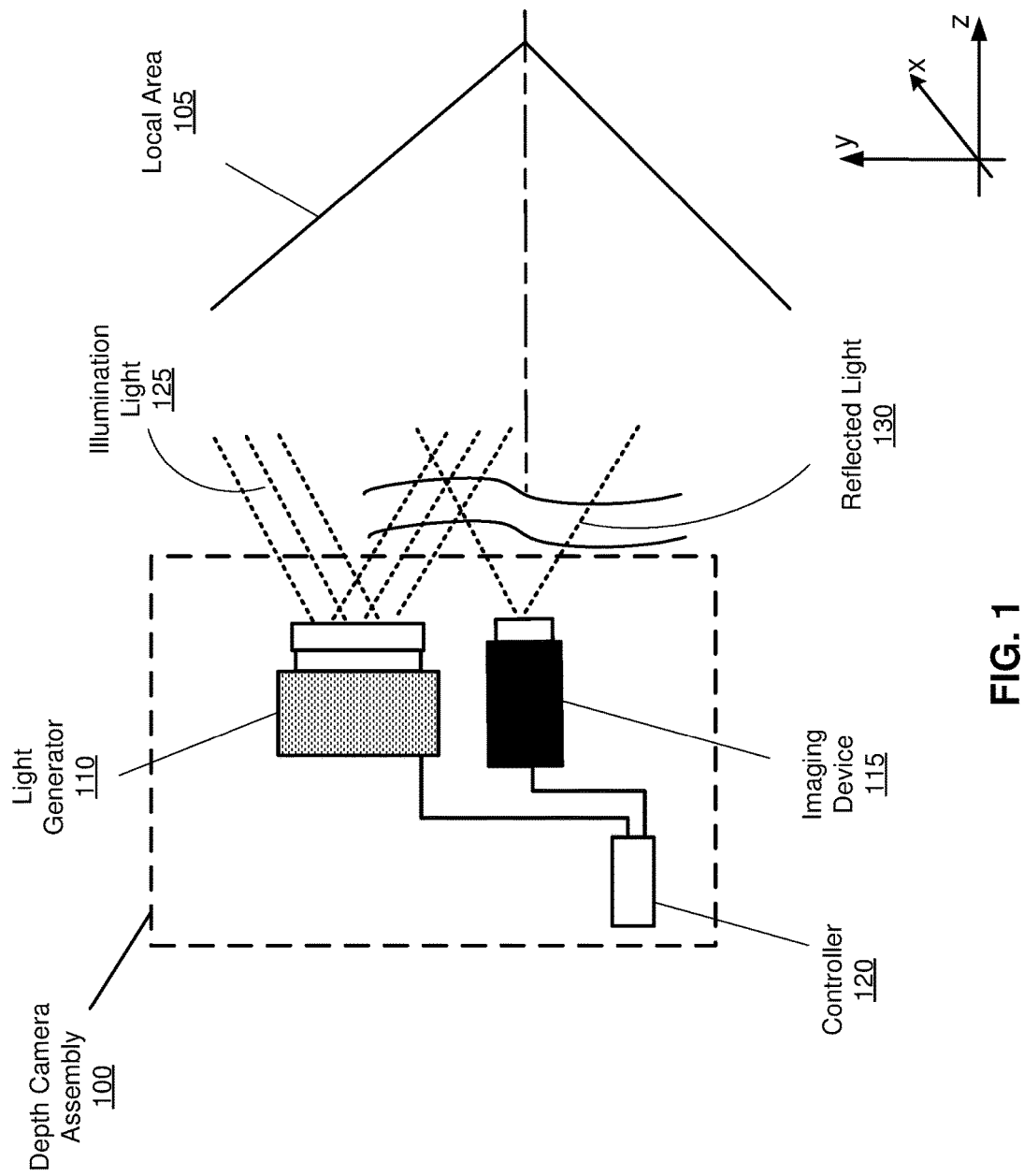
FIG. 1 is an example depth camera assembly (DCA), in accordance with an embodiment.

FIG. 1 is an example DCA 100 configured for depth sensing, in accordance with an embodiment. The DCA 100 may be configured to determine depth information of one or more objects in a local area 105 surrounding some or all of the DCA 100. The DCA 100 includes a light generator 110, an imaging device 115, and a controller 120 that may be coupled to both the light generator 110 and the imaging device 115. The light generator 110 illuminates the local area 105 with illumination light 125 in accordance with emission instructions generated by the controller 120. In some embodiments, for depth sensing based on structured light illumination, the illumination light 125 is a structured light pattern, e.g., dot pattern or stripe pattern. In alternate embodiments, for depth sensing based on time-of-flight, the illumination light 125 is an infrared flash of light. In some other embodiments, for depth sensing based upon stereo methods, the illumination light 125 is an infrared flash of light that is triggered upon image quality conditions set by multiple sensors in the DCA 100, which would otherwise work with passive illumination sources (natural or artificial visible and/or infrared light). In alternate embodiments, the DCA 100 is a passive DCA where light that illuminates the local area is ambient light from, e.g., natural or artificial light sources (not shown in FIG. 1).

The light generator 110 may include a plurality of emitters that each emits light having certain characteristics (e.g., wavelength, polarization, coherence, pulse width, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL, both singularly and in an array layout), or some other source. In some embodiments, a single emitter or a plurality of emitters in the light generator 110 can emit light having a structured light pattern, e.g., a dot pattern or a pseudo-random pattern of various angular shapes. In some embodiments, the light generator 110 includes a laser diode (e.g., infrared laser diode, such as an edge emitter or VCSEL) and a polarizing element (not shown in FIG. 1) for generating the illumination light 125 as polarized light, e.g., circularly polarized light. The polarizing element integrated into the light generator 110 can be a linear polarizer, a circular polarizer, an elliptical polarizer, etc. The polarizing element can be implemented as a thin film polarizer (absorptive, reflective), a quarter wave plate, a quarter wave plate combined with a linear polarizer, etc.

The imaging device 115 is configured to capture portions of light 130 reflected from the local area 105. The imaging device 115 may include a charge-coupled device (CCD) detector, a complementary metal-oxide-semiconductor (CMOS) detector or some other types of detectors (not shown in FIG. 1). The imaging device 115 may also include a polarization sensitive photodetector that uses, e.g., optically anisotropic materials to detect photons of a specific polarization, e.g., linear, circular, elliptical, etc. The imaging device 115 captures, e.g., via a detector, one or more images of one or more objects in the local area 105 illuminated with the illumination light 125. More details about operation of the detector of the imaging device 115 are discussed in conjunction with FIGS. 2-3.

The controller 120 controls operations of various modules of the DCA 100 in FIG. 1, based on the emission instructions. In some embodiments, the controller 120 controls operation of certain components of the light generator 110, based on the emission instructions. The controller 120 may provide emission instructions to one or more emitters (not shown in FIG. 1) of the light generator 110 to control intensity of one or more optical beams emitted from the one or more emitters, modulation of the one or more optical beams, a time duration during which the light generator 110 is activated, etc. The controller 120 may further create the emission instructions which include a radio frequency at which one or more optical elements (e.g., one or more acousto-optic devices, not shown in FIG. 1) within the light generator 110 is driven. The controller 120 may generate the emission instructions based on, e.g., a predetermined list of values for the radio frequency stored in a look-up table of the controller 120. In an embodiment, the predetermined radio frequencies are stored as waveforms in an electronic chip, e.g., in a direct digital synthesizer (not shown in FIG. 1) coupled to the controller 120. In another embodiment, the emission instructions are created by a voice control integrated into the controller 120. Upon a verbal request, the voice control of the controller 120 computes a radio frequency for driving the one or more acousto-optic devices within the light generator 110 to generate the illumination light 125 of a specific spatial frequency suitable for detection of stationary object(s) and/or tracking of moving object(s) in the local area 105 at a certain distance from the imaging device 115.

The controller 120 may be directly coupled to a detector of the imaging device 115. The controller 120 may be configured to read, from the detector, image data (i.e., light intensity or analog/digital signals) of the captured portions of the reflected light 130 that correspond to a read-out area of the detector. In some embodiments, the detector includes a two-dimensional array of pixels, and the read-out area of the detector includes a plurality of pixel rows and a plurality of pixel columns. In accordance with embodiments of the present disclosure, a size of the read-out area of the detector can be dynamically adjustable, e.g., based on a distance from the detector to an object of interest in the local area 105. Furthermore, position of the read-area of the detector may change based on position change of the object of interest. The read-out area of the detector may be of rectangular shape, square shape, circular shape, or some other suitable shape of pixels that capture image data associated with the object of interest. The controller 120 may be configured to adjust a size and/or position of the read-out area based on a distance to an object of interest. More details about adjusting a size/position of a read-out area of a detector and reading image data from the adjustable read-out area of the detector are disclosed in conjunction with FIGS. 2-3.

The controller 120 is further configured to determine depth information for one or more objects in the local area 105 based at least in part on the captured portions of the reflected light 130. In some embodiments, the controller 120 is configured to determine depth information based on phase-shifted patterns of the portions of the reflected light 130 distorted by shapes of the one or more objects in the local area 105, and/or by using triangulation calculation to obtain a depth map of the local area 105. In one embodiment, the depth map of the local area 105 can be determined by capturing portions of the reflected light 130 using the imaging device 115 with a single camera. In another embodiment, the triangulation calculation for depth determination can be generated from a baseline (separation, e.g., along y dimension) between an illumination source of the light generator 110 and a camera of the imaging device 115

(not shown in FIG. 1). In yet another embodiment, the triangulation calculation for depth determination can be generated from multiple (two or more) cameras of the for the imaging device 115 stereo vision methods of depth sensing (not shown in FIG. 1). In some embodiments, the controller 120 provides the determined depth information to a console (not shown in FIG. 1) and/or an appropriate module of a HMD (not shown in FIG. 1). The console and/or the HMD may utilize the depth information to, e.g., generate content for presentation to a user on an electronic display of the HMD.

Figure 2:
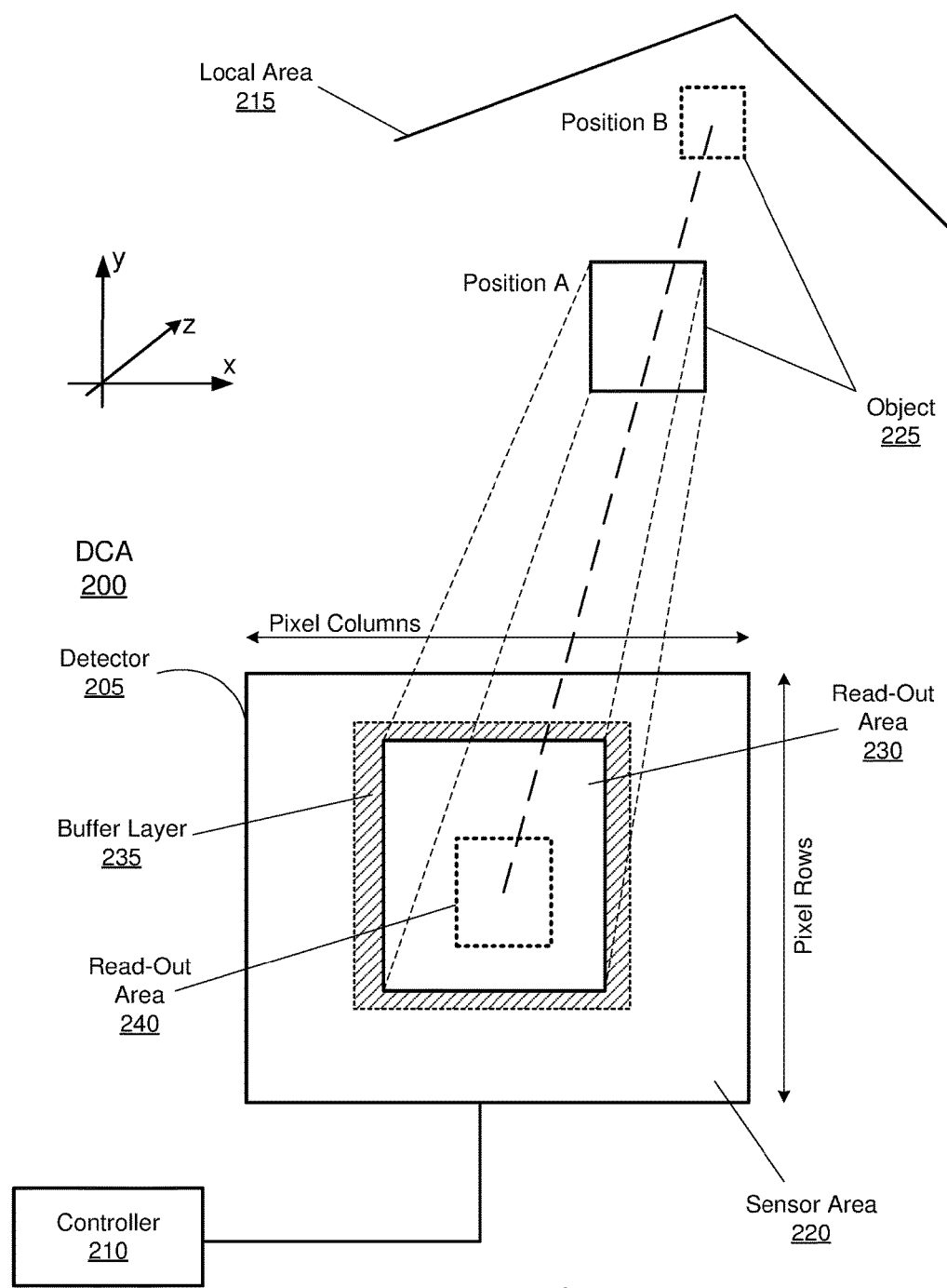
FIG. 2 is an example DCA having a detector with a dynamically adjustable read-out area, in accordance with an embodiment.

FIG. 2 is an example DCA 200 having an imaging portion that includes a detector 205 with a dynamically adjustable read-out area coupled to a controller 210, in accordance with an embodiment. A local area 215 surrounding some or all of the DCA 200 is illuminated by light emitted from a light generator that is omitted from FIG. 2 for simplicity. The DCA 200 can be an embodiment of the DCA 100 in FIG. 1, the detector 205 can be part of the imaging device 115, and the controller 210 can be an embodiment of the controller 120. The detector 205 includes a plurality of pixel rows and a plurality of pixel columns that form a dynamically adjustable read-out area. The detector 205 may include a sensor area 220 having a two-dimensional array of M×N pixels, wherein M and N are integers, and in some cases M and N can be the same value. For example, the detector 205 may include the sensor area 220 having 1000 columns of pixels (i.e., N=1000) and 2000 rows of pixels (i.e., M=2000), i.e., the detector 205 may be 2-megapixel sensor. It should be noted that the sensor area 220 represents a maximum size read-out area of the detector 205.

In some embodiments, during initialization of the DCA 200, the controller 210 can be configured to read image data (i.e., equivalent phase or light intensity signals) associated with all pixels in the detector 205. Thus, during initialization, a read-out area of the detector 205 includes the entire sensor area 220. Based on the image data read from the detector 205, the controller 210 may then search for one or more trackable features (e.g., blob segmentation, and the like) in the local area 215. In this way, the controller 210 may search for and track an object of interest 225 in the local area 220. It should be understood that the object 225 can be, e.g., a user wearing a HMD. In some embodiment, the object 225 is a moving object. In alternate embodiments, the object 225 is a stationary object at a particular distance (e.g., along z dimension) from the detector 205.

The process of acquiring image data by the pixels of the entire sensor area 220 and reading the acquired image data by the controller 210 can be repeated as long as the object 225 is within a threshold distance from the detector 205. In some embodiments, a distance between the object 225 and the detector 205 is measured as a distance along z dimension between a normal vector of the detector 205 (not shown in FIG. 2) and the object 225. In some embodiments, the threshold distance can be in the order of meters. For example, the threshold distance can be 4 meters, i.e., a tracking volume represented as a portion of a sphere determined by a field-of-view of the detector 205 has a radius of 4 meters. A mode of operation when the controller 210 reads image date acquired by the entire sensor area 220 can be referred to as a standard mode of operation of the DCA 200.

In some embodiments, if an image of the object 225 captured by the pixels of the detector 205 is associated with a portion of the sensor area 220 greater than a threshold area, the controller 210 identifies that the object 225 is within the threshold distance from the detector 205. The controller 210 may determine a size of the threshold area. In some embodiments, the controller 210 sets the size of the threshold area to a fixed value determined during, e.g., calibration of the detector 205. In alternate embodiments, the controller 210 dynamically adjusts the size of the threshold area based on, e.g., a size of and/or calculated distance to the object 225 being tracked. In some embodiments, both an apparent object size on the sensor area 220 and a calculated distance to the object 225 can be weighted based upon an application. In some setups, an image of the object 225 on the sensor area 220 is truncated and not all pixels of the sensor area 220 are read-out while a frame rate is increased to support object tracking beyond a certain range. As the object 225 moves further away from the detector 205 (e.g., along z or radial dimension), an image of the object 225 captured by the detector 205 can take up a smaller portion of the sensor area 220. If a rate of reading image data associated with the object 225 is kept constant, an error in, e.g., determining depth information of the object 225 may increase non-linearly. This is because the object 225 moves further away from the detector 205 and an amount of the image data associated with the object 225 captured by the detector 205 and provided to the controller 210 is reduced. The increase in error of determining depth information can be directly noticeable based on equation (1), i.e., the common stereo depth resolution equation:

$$\Delta z = \frac{z^2}{f \cdot b} \cdot \Delta d, \qquad (1)$$

where $\Delta z$ is a depth resolution (accuracy), z is a distance of the object 225 from the detector 205 along radial dimension (i.e., depth range), f is a focal length, b is a baseline and d is a disparity. It can be noted from equation (1) that the depth resolution (accuracy) is inversely proportional to the focal length and baseline, and proportional to the square of the depth range. Thus, the accuracy of depth resolution $\Delta z$ decreases non-linearly with the radial distance z of the object 225 from the detector 205. This holds for all stereo classes, such as structured light, and passive or active assisted stereo systems.

When a distance between the object 225 and the detector 205 (e.g., along z dimension) is greater than the threshold distance or an apparent size of the object 225 on the sensor area 220 is within a small enough limit (weighting between these metrics is variable by modality), the controller 210 is configured to read image data from a read-out area of the detector 205 having a smaller size than the entire sensor area 220. In this case, the controller 210 may determine a 6 degrees of freedom (DOF) pose or generalized depth-map (e.g., X, Y, Z coordinates in a mesh array) of the object 225 indicating that a distance of the object 225 from the detector 205 along z dimension is greater than the threshold distance. The controller 210 triggers a variable rate tracking mode of the DCA 200. In the variable rate tracking mode, the controller 210 adjusts a size of a read-out area of the detector 205 and a rate of reading image data from the detector 205, based on a distance (e.g., along z dimension) between the detector 205 and the object 225 and/or an apparent size of the object 225 on the sensor area 220 of the detector 205. In some embodiments, when the object 225 moves away from the detector 205, the controller 210 reduces a size of a read-out area of the detector 205 and increases a rate of reading image data from the reduced size read-out area, as discussed in more detail below. In alternate embodiments, when the object 225 moves closer to the detector 205, the controller 210 increases a size of a read-out area of the detector 205 and decreases a rate of reading image data from the increased size read-out area.

In the illustrative embodiment of FIG. 2, the object 225 moved away from the detector 205 (e.g., from an initial position not shown in FIG. 2) and occupies position A. When the object 205 was in the initial position, the controller 210 read image data associated with the entire sensor area 220, as the initial position of the object 225 was within the threshold distance from the detector 205. When the object 225 moved away from the detector 205 into position A, the variable rate tracking mode of the DCA 200 is activated as a distance along z dimension between the object 225 and the detector 205 is greater than the threshold distance. Note that the threshold distance can be related to a number of pixels of the sensor area 220 that capture an image of the object 225 or an image of a portion of the object 225. Thus, a large object 225 may have a relatively large threshold distance, and a very small object 225 may have a relatively short threshold distance. The controller 210 adjusts a size of a read-area of the detector 205 by reducing it from the entire sensor area 220 to a read-out area 230 shown in FIG. 2 that occupies a portion of the sensor area 220 along both x and y dimensions. In the illustrative embodiment of FIG. 2, the read-out area 230 includes a first subset of the plurality of pixel rows and a first subset of the plurality of pixel columns of the sensor area 220. However, it should be understood that the read-out area 230 can be reduced, relative to the sensor area 220, along only one dimension, i.e., either along pixel columns or pixel rows of the sensor area 220. A size of the read-out area 230 is inversely proportional to a distance (e.g., along z dimension) between the object 225 and the detector 205. The object 225 is associated with the read-out area 230 as intensities of image light reflected from the object 225 are captured by pixels of the read-out area 230. In some embodiments, the read-out area 230 is extended to include a buffer layer 235 with a defined number of pixel columns and/or a defined number of pixel rows added in addition to a minimum number of pixel rows and pixel columns associated with the object 225, as shown in FIG. 2. Then, the controller 210 may read image data captured by pixels of the read-out area 230 including additional pixels of the buffer layer 235.

Note that, in the variable rate tracking mode, the controller 210 may be configured not to read image data associated with pixel rows and pixel columns outside of the read-out area 230. Because of that, pixel rows and pixel columns of the sensor area 220 located outside of the read-out area 230 can be turned off to reduce power dissipation of the detector 205. As the controller 210 reads less amount of image data than in the standard mode of operation, a rate of reading data from the read-out area 230 can be faster than a rate of reading data from the entire sensor area 220 while preserving a bandwidth of data communication between the detector 205 and the controller 210. Because a rate of reading image data from the detector 205 increases, tracking performance achieved by the controller 210 can be improved. In some embodiments, the tracking performance measured as a maximum distance between the object 225 and the detector 205 for which the object 225 is accurately imaged can improve as a square root of a rate increase. For example, if a rate of reading image data from the detector 205 is increased by a factor of two, the tracking performance can be improved by a factor of $\sqrt{2}$ or by approximately 41%. In the illustrative embodiment of a tracking volume being a portion of sphere with a radius of 4 meters, approximately 1.5 meters can be added to the radius of the tracking volume.

In some embodiments, a rate of reading image data by the controller 210 increases along each dimension of the read-out area 230 that is being reduced relative to a corresponding dimension of the sensor area 220. For example, if pixel rows of the read-out area 230 represent a portion of the plurality of pixel rows of the sensor area 220, a rate of reading image data associated with the pixel rows of the read-out area 230 generally increases with reduction of a number of pixel rows in the read-out area 230. Similarly, if pixel columns of the read-out area 230 represent a portion of the plurality of pixel columns of the sensor area 220, a rate of reading data associated with the pixel columns of the read-out area 230 generally increases with reduction of a number of pixel columns in the read-out area 230. In the illustrative embodiment of FIG. 2 where the read-out area 230 includes a portion of the pixel rows and a portion of the pixel columns of the sensor area 220, a first rate of reading first image data associated with the read-out area 230 is increased along both pixel columns and pixel rows (along x and y dimensions) relative to a rate of reading image data associated with the entire sensor area 220.

As the object 225 moves and changes its position relative to the detector 205, the controller 210 may determine new position (e.g., position B in FIG. 2) of the object 225 based on the first image data read from the read-out area 230 at the first rate. In this case, the object 225 may be associated with a portion of the sensor area 220, and a size of the portion of the sensor area 220 is inversely proportional to a distance along z dimension between the object 225 and the detector 205. The controller 210 may then determine another read-out area 240 different from the read-out area 230, based on the size of the portion of the sensor area 220 associated with the object 225. In some embodiments, the controller 210 may determine a second rate to read image data from the detector 205 based in part on the size of the portion of the sensor area 220 associated with the object 225 relative to a threshold size. The controller 210 may then read, from the detector 205 at the second rate, second image data that correspond to the read-out area 240.

In the illustrative embodiment of FIG. 2, as the object 225 moves away from the detector 205 along z dimension, a size of the read-out area 240 becomes smaller (along one dimension or along both dimensions) relative to a size of the read-out area 230. The second rate of reading image data from the read-out area 240 then becomes faster than the first rate of reading image data from the read-out area 230. In one embodiment, the controller 210 adjusts the size of the read-out area 240 by decreasing a number of pixel rows in the read-out area 240 to a reduced set of pixel rows that is less than a first set of pixel rows of the read-out area 230. In this case, the controller 210 reads image data from the read-out area 240 at the second rate faster than the first rate based in part on the reduced set of pixels rows. In another embodiment, the controller 210 adjusts the size of the read-out area 240 by decreasing a number of pixel columns in the read-out area 240 to a reduced set of pixel columns that is less than the first set of pixel columns of the read-out area 230. In this case, the controller 210 reads image data from the read-out area 240 at the second rate faster than the first rate based in part on the reduced set of pixels columns.

In alternate embodiments (not shown in FIG. 2), as the object 225 moves closer to the detector 205, a size of the read-out area 240 becomes larger (along one dimension or along both dimensions) relative to a size of the read-out area 230. The second rate of reading image data from the read-out area 240 then becomes slower than the first rate of reading image data from the read-out area 230. In one embodiment, the controller 210 adjusts the size of the read-out area 240 by increasing a number of pixel rows in the read-out area 240 to an increased set of pixel rows that is greater than the first set of pixel rows of the read-out area 230. In this case, the controller 210 reads image data from the read-out area 240 at the second rate slower than the first rate based in part on the increased set of pixel rows. In another embodiment, the controller 210 adjusts the size of the read-out area 240 by increasing a number of pixel columns in the read-out area 240 to an increased set of pixel columns that is greater than the first set of pixel columns of the read-out area 230. In this case, the controller 210 reads image data from the read-out area 240 at the second rate slower than the first rate based in part on the increased set of pixel columns.

In some embodiments, the controller 210 adjusts the second rate of reading data from the detector 205. The controller 210 may change the second rate from one frame to another, e.g., to track two or more moving objects in the local area 215 (not shown in FIG. 2) that are imaged on different areas of the detector 205. Alternatively, the controller 210 may change the second rate from one frame to another based on the object 225 moving throughout the local area 215.

Figure 3:
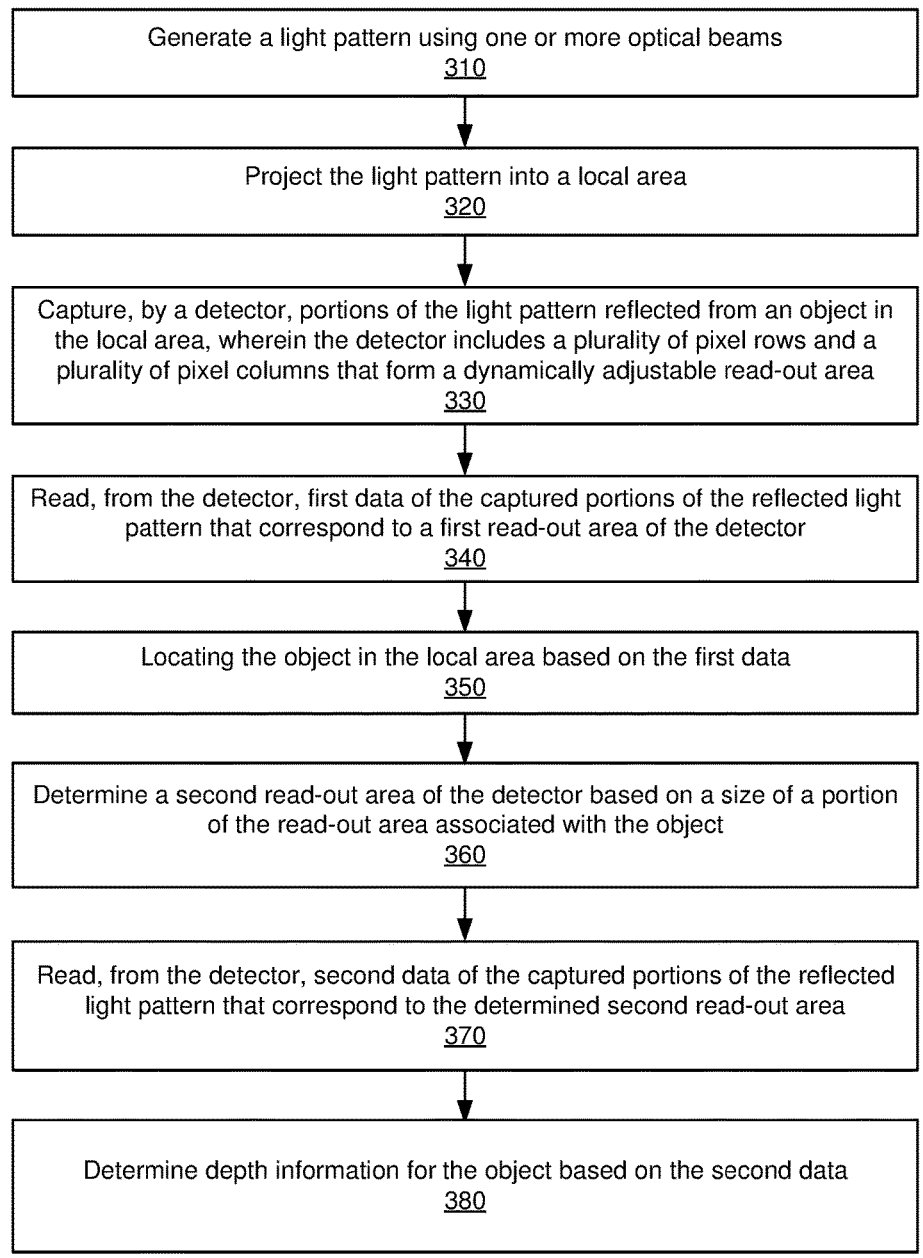
FIG. 3 is a flow chart illustrating a process of depth sensing, in accordance with an embodiment.

FIG. 3 is a flow chart illustrating a process 300 of determining depth information of an object in a local area, which may be implemented at the DCA 100 shown in FIG. 1, in accordance with an embodiment. The process 300 of FIG. 3 may be performed by components of a DCA (e.g., the DCA 100, the DCA 200 in FIG. 2). Other entities (e.g., a HMD and/or console) may perform some or all of the steps of the process in other embodiments. Likewise, embodiments may include different and/or additional steps, or perform the steps in different orders.

The DCA generates 310 (e.g., via a light generator) a light pattern using one or more optical beams. In some embodiments, the one or more optical beams are emitted from an illumination source (e.g., laser diode), based in part on emission instructions. In some embodiments, the DCA generates 310 (e.g., via one or more optical elements), based in part on the emission instructions, a light pattern from the one or more optical beams by diffracting the one or more optical beams to form the light pattern with a large field-of-view for scanning of the local area. In one embodiment, the light generator of the DCA includes a polarizing element to generate the light pattern as polarized light, e.g., circularly polarized at a first handedness. In an alternate embodiment, the illumination source of the light generator in the DCA directly generates the one or more optical beams as polarized light, and the light pattern includes light of a same polarization as polarization of the one or more optical beams. In some embodiments, for depth sensing based on structured light illumination, the DCA generates the light pattern as a structured light pattern, e.g., dot pattern or stripe pattern. In alternate embodiments, for depth sensing based on time-of-flight, the DCA generates the light pattern as an infrared flash of light.

The DCA projects 320 (e.g., via a projection assembly) the light pattern into a local area. In some embodiments, the light pattern includes light that is circularly polarized at a first handedness. In some embodiments, the DCA projects 320 the light pattern to illuminate a wide field-of-view of the local area for accurate depth sensing of the local area. The DCA may also control (e.g., via a controller) a size and an angular spread of a portion of the local area illuminated by the light pattern.

The DCA captures 330 (e.g., via a detector) portions of the light pattern reflected from the object in the local area. The detector includes a plurality of pixel rows and a plurality of pixel columns that form a dynamically adjustable read-out area. In some embodiments, a polarizing element is placed in front of a detector for receiving the portions of the reflected light pattern having a specific polarization and propagating the polarized reflected light pattern toward the detector. In one embodiment, the portions of the reflected light pattern include light that is circularly polarized at a second handedness orthogonal to the first handedness.

The DCA reads 340 (e.g., via a controller), from the detector, first data of the captured portions of the reflected light pattern that correspond to a first read-out area of the detector. In some embodiments, the DCA reads 340 the first data at a first rate. The first read-out area of the detector may include a first set of the plurality of pixel rows and a first set of the plurality of pixel columns.

The DCA locates 350 (e.g., via the controller) the object in the local area based on the first data. In some embodiments, the DCA locates 350 the object based on determining a distance between the object and the DCA, e.g., along a specific dimension of a tracking volume. The located object is associated with a portion of the read-out area of the detector. A size of the portion of the read-out area is inversely proportional to the distance between the object and the detector.

The DCA determines 360 (e.g., via the controller) a second read-out area of the detector based on the size of the portion of the read-out area associated with the object. In some embodiments, the second read-out area is a same size as the size of the portion of the read-out area associated with the object. In alternate embodiments, the second read-out area is of a size smaller than the size of the portion of the read-out area associated with the object. In some other embodiments, to support larger velocities (e.g., human velocities) of the object, the second read-out area is of a size larger than the size of the portion of the read-out area associated with the object. In some embodiments, the DCA adjusts a size of the second read-out area by decreasing a number of pixel rows in the second read-out area to a reduced set of pixel rows that is less than the first set of pixel rows, wherein the second rate is faster than the first rate based in part on the reduced set of pixel rows. In some embodiments, the DCA adjusts a size of the second read-out area by decreasing a number of pixel columns in the second read-out area to a reduced set of pixel columns that is less than the first set of pixel columns, wherein the second rate is faster than the first rate based in part on the reduced set of pixel columns. In some embodiments, the DCA adjusts a size of the second read-out area by increasing a number of pixel rows in the second read-out area to an increased set of pixel rows that is greater than the first set of pixel rows, wherein the second rate is slower than the first rate based in part on the increased set of pixel rows. In some embodiments, the DCA adjusts a size of the second read-out area by increasing a number of pixel columns in the second read-out area to an increased set of pixel columns that is greater than the first set of pixel columns, wherein the second rate is slower than the first rate based in part on the increased set of pixel columns.

In some embodiments, the DCA further determines a second rate to read data from the detector based in part on the size of the portion of the read-out area associated with the object relative to a threshold size.

The DCA reads 370 (e.g., via the controller), from the detector, second data of the captured portions of the reflected light pattern that correspond to the determined second read-out area. In some embodiments, the DCA reads 370 the second data at the second rate. In some embodiments, the DCA adjusts the second rate of reading third data from the detector captured by the detector following capturing the second data, based on changing locations of one or more objects in the local area from a time instant the second data are captured to another time instant the third data are captured.

The DCA determines 380 (e.g., via the controller) depth information for the object based on the second data. In some embodiments, for depth sensing based on structured light illumination or stereo illumination, the DCA captures geometrically or phase-shifted patterns of the reflected light pattern distorted by one or more shapes of one or more surfaces of the object in the local area, and uses triangulation calculation to obtain a depth map for the object. The DCA may enhance depth resolution of the local area based on, e.g., information about polarization of the captured portions of the reflected light pattern. In alternate embodiments, for depth sensing based on time-of-flight, the DCA determines the depth information using a ratio of charges stored in storage bins associated with each pixel in the detector. In this case, the detector can be configured to store charge in each storage bin associated with an intensity of captured light for a particular amount of time.

In some embodiments, the DCA is configured as part of a station separate from a HMD. The station may be a console or some other device interfaced (through a wired or wireless connection) with the HMD. The station may be part of, e.g., a VR system, an AR system, a MR system, or some combination thereof. The station can perform tracking and depth sensing of the object including a user wearing the HMD. The station may provide the determined depth information to the HMD, e.g., for presentation to the user.

In some embodiments, the DCA is configured as part of a HMD. In one embodiment, the DCA provides the determined depth information to a console coupled to the HMD. The console is then configured to generate content for presentation on an electronic display of the HMD, based on the depth information. In another embodiment, the DCA provides the determined depth information to a module of the HMD that generates content for presentation on the electronic display of the HMD, based on the depth information. In an alternate embodiment, the DCA is integrated into a HMD as part of an AR system. In this case, the DCA may be configured to sense and display objects behind a head of a user wearing the HMD or display objects recorded previously. In some embodiments, the HMD shares the determined depth information obtained by the DCA with another remote user to support, e.g., telepresence. In alternate embodiments, the depth information determined by the DCA can be used for hand-tracking or facial/body tracking in general. Thus, the object being tracked can be selected from a group consisting of a HMD, a head of a human, a hand of the human, and at least one body part of the human.

System Environment

Figure 4:
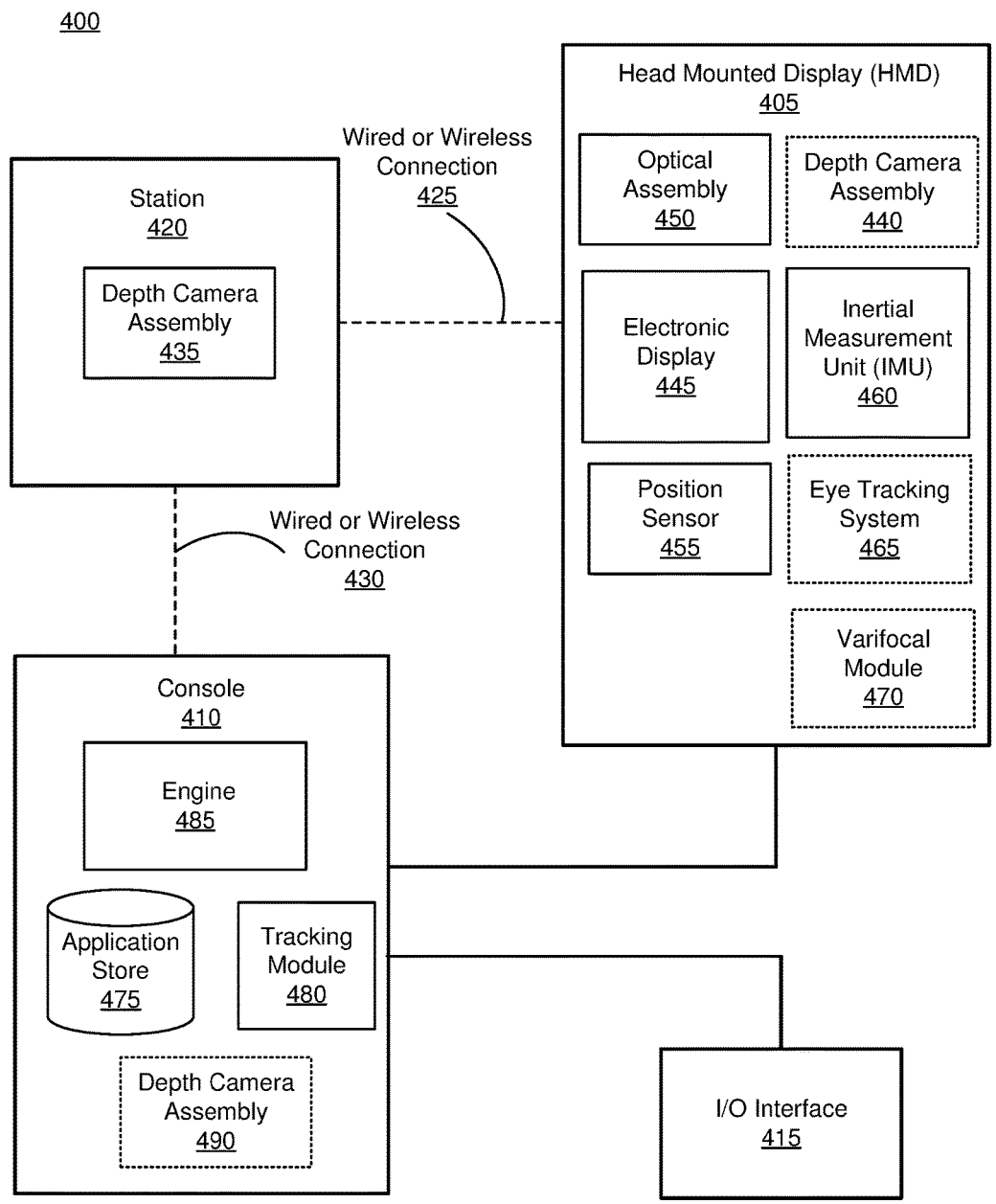
FIG. 4 is a block diagram of a head-mounted display (HMD) system in which the DCA in FIG. 1 and a console operate, in accordance with an embodiment.

FIG. 4 is a block diagram of one embodiment of a HMD system 400 in which a console 410 operates. The HMD system 400 may operate in a VR system environment, an AR system environment, a MR system environment, or some combination thereof. The HMD system 400 shown by FIG. 4 comprises a HMD 405, an input/output (I/O) interface 415 that is coupled to the console 410, and a station 420 (e.g., base station) separate from the HMD 405 and the console 410. While FIG. 4 shows an example HMD system 400 including one HMD 405, one I/O interface 415, and one station 420, in other embodiments any number of these components may be included in the HMD system 400. For example, there may be multiple HMDs 405 each having an associated I/O interface 415, with each HMD 405 and I/O interface 415 communicating with the console 410. Also, there may be multiple stations 420 each communicating via a separate wireless or wired connection with the HMD 405 and/or the console 410. In alternative configurations, different and/or additional components may be included in the HMD system 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the HMD 405.

The HMD system 400 includes the station 420 (e.g., base station) separate from the HMD 405 and the console 410. The station 420 may be interfaced via a wired or wireless connection 425 with the HMD 405. Also, the station 420 may be interfaced via a wired or wireless connection 430 with the console 410. The station 420 comprises a DCA 435 that includes a light generator, a detector, and a controller coupled to the detector.

The light generator of the DCA 435 is configured to illuminate a local area with a light pattern. The detector of the DCA 435 is configured to capture portions of the light pattern reflected from an object in the local area. The detector of the DCA 435 includes a plurality of pixel rows and a plurality of pixel columns that form a dynamically adjustable read-out area. The controller of the DCA 435 reads, from the detector at a first rate, first data of the captured portions of the reflected light pattern that correspond to a first read-out area of the detector. The controller of the DCA 435 locates the object in the local area based on the first data. The object is associated with a portion of the read-out area of the detector, and a size of the portion of the read-out area is inversely proportional to a distance between the object and the detector. The controller of the DCA 435 determines a second read-out area of the detector based on the size of the portion of the read-out area associated with the object. In some embodiments, the controller of the DCA 435 determines a second rate to read data from the detector based in part on the size of the portion of the read-out area associated with the object relative to a threshold size. The controller of the DCA 435 reads, from the detector at the second rate, second data of the captured portions of the reflected light pattern that correspond to the determined second read-out area. The controller of the DCA 435 determines depth information for the object based on the second data.

The DCA 435 is an embodiment of the DCA 100 in FIG. 1 or an embodiment of the DCA 200 in FIG. 2. In one embodiment, the DCA 435 provides the determined depth information to the console 410 via the wireless or wired connection 430. In another embodiment, the DCA 435 provides the determined depth information to the HMD 405 via the wireless or wired connection 425.

The HMD 405 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 405, the console 410, or both, and presents audio data based on the audio information. The HMD 405 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

The HMD 405 includes an optional DCA 440, an electronic display 445, an optical assembly 450, one or more position sensors 455, an IMU 460, an optional eye tracking system 465, and an optional varifocal module 470. Some embodiments of the HMD 405 have different components than those described in conjunction with FIG. 4. Additionally, the functionality provided by various components described in conjunction with FIG. 4 may be differently distributed among the components of the HMD 405 in other embodiments.

In some embodiments, the HMD 405 includes the DCA 440 having the same components and operating in the same manner as the DCA 435. The DCA 440 captures data describing depth information of a local area surrounding some or all of the HMD 405. The DCA 440 can compute the depth information using the data (e.g., based on captured portions of reflected light), or the DCA 440 can send this information to another device such as the console 410 that can determine the depth information using the data from the DCA 440. The DCA 440 is an embodiment of the DCA 100 in FIG. 1 or an embodiment of the DCA 200 in FIG. 2.

The electronic display 445 displays 2D or 3D images to the user in accordance with data received from the console 410. In various embodiments, the electronic display 445 comprises a single electronic display or multiple electronic displays (e.g., a display for each eye of a user). Examples of the electronic display 445 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, some other display, or some combination thereof.

The optical assembly 450 magnifies image light received from the electronic display 445, corrects optical errors associated with the image light, and presents the corrected image light to a user of the HMD 405. The optical assembly 450 includes a plurality of optical elements. Example optical elements included in the optical assembly 450 include: an aperture, a Fresnel lens, a convex lens, a concave lens, a filter, a reflecting surface, or any other suitable optical element that affects image light. Moreover, the optical assembly 450 may include combinations of different optical elements. In some embodiments, one or more of the optical elements in the optical assembly 450 may have one or more coatings, such as partially reflective or anti-reflective coatings.

Magnification and focusing of the image light by the optical assembly 450 allows the electronic display 445 to be physically smaller, weigh less and consume less power than larger displays. Additionally, magnification may increase the field of view of the content presented by the electronic display 445. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 450 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 445 for display is pre-distorted, and the optical assembly 450 corrects the distortion when it receives image light from the electronic display 445 generated based on the content.

The IMU 460 is an electronic device that generates data indicating a position of the HMD 405 based on measurement signals received from one or more of the position sensors 455 and from depth information received from the DCA 440 or from the DCA 435. A position sensor 455 generates one or more measurement signals in response to motion of the HMD 405. Examples of position sensors 455 include: one or more accelerometers, one or more gyroscopes, one or more magnetometers, another suitable type of sensor that detects motion, a type of sensor used for error correction of the IMU 460, or some combination thereof. The position sensors 455 may be located external to the IMU 460, internal to the IMU 460, or some combination thereof.

Based on the one or more measurement signals from one or more position sensors 455, the IMU 460 generates data indicating an estimated current position of the HMD 405 relative to an initial position of the HMD 405. For example, the position sensors 455 include multiple accelerometers to measure translational motion (forward/back, up/down, left/right) and multiple gyroscopes to measure rotational motion (e.g., pitch, yaw, roll). In some embodiments, the IMU 460 rapidly samples the measurement signals and calculates the estimated current position of the HMD 405 from the sampled data. For example, the IMU 460 integrates the measurement signals received from the accelerometers over time to estimate a velocity vector and integrates the velocity vector over time to determine an estimated current position of a reference point on the HMD 405. Alternatively, the IMU 460 provides the sampled measurement signals to the console 410, which interprets the data to reduce error. The reference point is a point that may be used to describe the position of the HMD 405. The reference point may generally be defined as a point in space or a position related to the HMD's 405 orientation and position.

The IMU 460 receives one or more parameters from the console 410. The one or more parameters are used to maintain tracking of the HMD 405. Based on a received parameter, the IMU 460 may adjust one or more IMU parameters (e.g., sample rate). In some embodiments, certain parameters cause the IMU 460 to update an initial position of the reference point so it corresponds to a next position of the reference point. Updating the initial position of the reference point as the next calibrated position of the reference point helps reduce accumulated error associated with the current position estimated the IMU 460. The accumulated error, also referred to as drift error, causes the estimated position of the reference point to "drift" away from the actual position of the reference point over time. In some embodiments of the HMD 405, the IMU 460 may be a dedicated hardware component. In other embodiments, the IMU 460 may be a software component implemented in one or more processors.

In some embodiments, the eye tracking system 465 is integrated into the HMD 405. The eye tracking system 465 determines eye tracking information associated with an eye of a user wearing the HMD 405. The eye tracking information determined by the eye tracking system 465 may comprise information about an orientation of the user's eye, i.e., information about an angle of an eye-gaze. In some embodiments, the eye tracking system 465 is integrated into the optical assembly 450. An embodiment of the eye-tracking system 465 may comprise an illumination source and an imaging device (camera).

In some embodiments, the varifocal module 470 is further integrated into the HMD 405. The varifocal module 470 may be coupled to the eye tracking system 465 to obtain eye tracking information determined by the eye tracking system 465. The varifocal module 470 may be configured to adjust focus of one or more images displayed on the electronic display 445, based on the determined eye tracking information obtained from the eye tracking system 465. In this way, the varifocal module 470 can mitigate vergence-accommodation conflict in relation to image light. The varifocal module 470 can be interfaced (e.g., either mechanically or electrically) with at least one of the electronic display 445 and at least one optical element of the optical assembly 450. Then, the varifocal module 470 may be configured to adjust focus of the one or more images displayed on the electronic display 445 by adjusting the optical position of at least one of the electronic display 445 and the at least one optical element of the optical assembly 450, based on the determined eye tracking information obtained from the eye tracking system 465. By adjusting the optical position, the varifocal module 470 varies focus of image light output from the electronic display 445 towards the user's eye. The varifocal module 470 may be also configured to adjust resolution of the images displayed on the electronic display 445 by performing foveated rendering of the displayed images, based at least in part on the determined eye tracking information obtained from the eye tracking system 465. In this case, the varifocal module 470 provides appropriate image signals to the electronic display 445. The varifocal module 470 provides image signals with a maximum pixel density for the electronic display 475 only in a foveal region of the user's eye-gaze, while providing image signals with lower pixel densities in other regions of the electronic display 465. In one embodiment, the varifocal module 450 may utilize the depth information obtained by the DCA 440 or the DCA 435 to, e.g., generate content for presentation on the electronic display 425.

The I/O interface 415 is a device that allows a user to send action requests and receive responses from the console 410. An action request is a request to perform a particular action. For example, an action request may be an instruction to start or end capture of image or video data or an instruction to perform a particular action within an application. The I/O interface 415 may include one or more input devices. Example input devices include: a keyboard, a mouse, a game controller, or any other suitable device for receiving action requests and communicating the action requests to the console 410. An action request received by the I/O interface 415 is communicated to the console 410, which performs an action corresponding to the action request. In some embodiments, the I/O interface 415 includes an IMU 460 that captures calibration data indicating an estimated position of the I/O interface 415 relative to an initial position of the I/O interface 415. In some embodiments, the I/O interface 415 may provide haptic feedback to the user in accordance with instructions received from the console 410. For example, haptic feedback is provided when an action request is received, or the console 410 communicates instructions to the I/O interface 415 causing the I/O interface 415 to generate haptic feedback when the console 410 performs an action.

The console 410 provides content to the HMD 405 for processing in accordance with information received from one or more of: the DCA 435, the DCA 440, the HMD 405, and the I/O interface 415. In the example shown in FIG. 4, the console 410 includes an application store 455, a tracking module 480, an engine 485, and an optional DCA 490. Some embodiments of the console 410 have different modules or components than those described in conjunction with FIG. 4. Similarly, the functions further described below may be distributed among components of the console 410 in a different manner than described in conjunction with FIG. 4.

The application store 475 stores one or more applications for execution by the console 410. An application is a group of instructions, that when executed by a processor, generates content for presentation to the user. Content generated by an application may be in response to inputs received from the user via movement of the HMD 405 or the I/O interface 415. Examples of applications include: gaming applications, conferencing applications, video playback applications, or other suitable applications.

The tracking module 480 calibrates the HMD system 400 using one or more calibration parameters and may adjust one or more calibration parameters to reduce error in determination of the position of the HMD 405 or of the I/O interface 415. For example, the tracking module 480 communicates a calibration parameter to the DCA 435 or the DCA 440 to adjust the focus of the DCA 435 or the DCA 440 to more accurately determine positions of structured light elements captured by the DCA 435 or the DCA 440. Calibration performed by the tracking module 480 also accounts for information received from the IMU 460 in the HMD 405 and/or an IMU 460 included in the I/O interface 415. Additionally, if tracking of the HMD 405 is lost (e.g., the DCA 435 or the DCA 440 loses line of sight of at least a threshold number of structured light elements), the tracking module 480 may re-calibrate some or all of the HMD system 400.

The tracking module 480 tracks movements of the HMD 405 or of the I/O interface 415 using information from the DCA 435, the DCA 440, the one or more position sensors 455, the IMU 460 or some combination thereof. For example, the tracking module 480 determines a position of a reference point of the HMD 405 in a mapping of a local area based on information from the HMD 405. The tracking module 480 may also determine positions of the reference point of the HMD 405 or a reference point of the I/O interface 415 using data indicating a position of the HMD 405 from the IMU 460 or using data indicating a position of the I/O interface 415 from an IMU 460 included in the I/O interface 415, respectively. Additionally, in some embodiments, the tracking module 480 may use portions of data indicating a position or the HMD 405 from the IMU 460 as well as representations of the local area from the DCA 435 or the DCA 440 to predict a future location of the HMD 405. The tracking module 480 provides the estimated or predicted future position of the HMD 405 or the I/O interface 415 to the engine 485.

The engine 485 generates a 3D mapping of the area surrounding some or all of the HMD 405 (i.e., the "local area") based on information received from the HMD 405. In some embodiments, the engine 485 determines depth information for the 3D mapping of the local area based on information received from the DCA 435 or the DCA 440 that is relevant for techniques used in computing depth. The engine 485 may calculate depth information using one or more techniques in computing depth from the portion of the reflected light detected by the DCA 435 or the DCA 440, such as the stereo based techniques, the structured light illumination technique, and the time-of-flight technique. In various embodiments, the engine 485 uses the depth information to, e.g., update a model of the local area, and generate content based in part on the updated model.

The engine 485 also executes applications within the HMD system 400 and receives position information, acceleration information, velocity information, predicted future positions, or some combination thereof, of the HMD 405 from the tracking module 480. Based on the received information, the engine 485 determines content to provide to the HMD 405 for presentation to the user. For example, if the received information indicates that the user has looked to the left, the engine 485 generates content for the HMD 405 that mirrors the user's movement in a virtual environment or in an environment augmenting the local area with additional content. Additionally, the engine 485 performs an action within an application executing on the console 410 in response to an action request received from the I/O interface 415 and provides feedback to the user that the action was performed. The provided feedback may be visual or audible feedback via the HMD 405 or haptic feedback via the I/O interface 415.

In some embodiments, based on the eye tracking information (e.g., orientation of the user's eye) received from the eye tracking system 465, the engine 485 determines resolution of the content provided to the HMD 405 for presentation to the user on the electronic display 445. The engine 485 may be configured to adjust resolution of the content provided to the HMD 405 by performing foveated rendering of the presented content, based at least in part on the determined eye tracking information obtained from the eye tracking system 465. The engine 485 provides the content to the HMD 405 having a maximum pixel resolution on the electronic display 445 in a foveal region of the user's gaze, whereas the engine 485 provides a lower pixel resolution in other regions of the electronic display 445, thus achieving less power consumption at the HMD 405 and saving computing cycles of the console 410 without compromising a visual experience of the user. In some embodiments, the engine 485 can further use the eye tracking information to adjust where objects are displayed on the electronic display 485 to prevent vergence-accommodation conflict.

In some embodiments, the console 410 includes the DCA 490 having the same components and operating in the same manner as the DCA 435. The DCA 490 captures data describing depth information of a local area surrounding some or all of the console 410. The DCA 490 can compute the depth information using the data (e.g., based on captured portions of reflected light), or the DCA 490 can send this information to another device such as the HMD 405 that can determine the depth information using the data from the DCA 490. The engine 485 can use the depth information computed by the DCA 490 to generate content for presentation on the electronic display 445 of the HMD 405. The DCA 490 is an embodiment of the DCA 100 in FIG. 1 or an embodiment of the DCA 200 in FIG. 2.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
 a detector configured to capture portions of light reflected from a tracking object in a local area, the detector includes a plurality of pixel rows and a plurality of pixel columns that form a dynamically adjustable read-out area; and
 a controller configured to:
  read, from the detector at a first rate, first data of the captured portions of the reflected light that correspond to a first read-out area of the detector,
  determine a distance to the tracking object in the local area based on the first data, wherein the tracking object is imaged on a portion of the read-out area of the detector,
  initiate a variable rate tracking mode of the DCA based on the distance, upon initiating the variable rate tracking mode, adjust a threshold size of the read-out area of the detector, based on a size of the portion of the read-out area and the distance, determine a second read-out area of the detector, based in part on the size of the portion of the read-out area, determine a second rate to read data from the detector, based in part on the size of the portion of the read-out area relative to the threshold size, read, from the detector at the second rate, second data of the captured portions of the reflected light that correspond to the determined second read-out area, and determine depth information for the tracking object based on the second data.

2. The DCA of claim 1, wherein the second read-out area is a same size as the size of the portion of the read-out area.

3. The DCA of claim 1, wherein the second read-out area is of a size different than the size of the portion of the read-out area.

4. The DCA of claim 1, wherein the portion of the read-out area is associated with a first set of the plurality of pixel columns, and the controller is further configured to:
determine the second read-out area of the detector to include the first set of pixel columns.

5. The DCA of claim 1, wherein the portion of the read-out area is associated with a first set of the plurality of pixel rows, and the controller is further configured to:
determine the second read-out area of the detector to include the first set of pixel rows.

6. The DCA of claim 1, wherein the first read-out area of the detector includes a first set of the plurality of pixel rows and a first set of the plurality of pixel columns, and the controller is further configured to:
adjust a size of the second read-out area by decreasing a number of pixel rows in the second read-out area to a reduced set of pixel rows that is less than the first set of pixel rows; and
wherein the second rate is faster than the first rate based in part on the reduced set of pixels rows.

7. The DCA of claim 1, wherein the first read-out area of the detector includes a first set of the plurality of pixel rows and a first set of the plurality of pixel columns, and the controller is further configured to:
adjust a size of the second read-out area by decreasing a number of pixel columns in the second read-out area to a reduced set of pixel columns that is less than the first set of pixel columns; and
wherein the second rate is faster than the first rate based in part on the reduced set of pixel columns.

8. The DCA of claim 1, wherein the first read-out area of the detector includes a first set of the plurality of pixel rows and a first set of the plurality of pixel columns, and the controller is further configured to:
adjust a size of the second read-out area by increasing a number of pixel rows in the second read-out area to an increased set of pixel rows that is greater than the first set of pixel rows; and
wherein the second rate is slower than the first rate based in part on the increased set of pixel rows.

9. The DCA of claim 1, wherein the first read-out area of the detector includes a first set of the plurality of pixel rows and a first set of the plurality of pixel columns, and the controller is further configured to:
adjust a size of the second read-out area by increasing a number of pixel columns in the second read-out area to an increased set of pixel columns that is greater than the first set of pixel columns; and
wherein the second rate is slower than the first rate based in part on the increased set of pixel columns.

10. The DCA of claim 1, wherein the object is selected from a group consisting of a head-mounted display, a head of a human, a hand of the human, and at least one body part of the human.

11. The DCA of claim 1, wherein the controller is further configured to:
adjust the second rate of reading third data from the detector captured by the detector following capturing the second data, based on changing locations of one or more objects in the local area from a time instant the second data are captured to another time instant the third data are captured.

12. A method comprising:
generating a light pattern using one or more optical beams;
projecting the light pattern into a local area;
capturing, by a detector, portions of the light pattern reflected from a tracking object in the local area, wherein the detector includes a plurality of pixel rows and a plurality of pixel columns that form a dynamically adjustable read-out area;
reading, from the detector at a first rate, first data of the captured portions of the reflected light pattern that correspond to a first read-out area of the detector;
determining a distance to the tracking object in the local area based on the first data, wherein the tracking object is imaged on a portion of the read-out area of the detector;
initiating a variable rate tracking mode of the DCA based on the distance;
upon initiating the variable rate tracking mode, adjusting a threshold size of the read-out area of the detector, based on a size of the portion of the read-out area and the distance;
determining a second read-out area of the detector, based in part on the size of the portion of the read-out area;
determining a second rate to read data from the detector, based in part on the size of the portion of the read-out area relative to the threshold size;
reading, from the detector at the second rate, second data of the captured portions of the reflected light pattern that correspond to the determined second read-out area; and
determining depth information for the tracking object based on the second data.

13. The method of claim 12, wherein the portion of the read-out area is associated with a first set of the plurality of pixel columns, and the method further comprising:
determining the second read-out area of the detector that includes the first set of pixel columns.

14. The method of claim 12, wherein the portion of the read-out area is associated with a first set of the plurality of pixel rows, and the method further comprising:
determining the second read-out area of the detector that includes the first set of pixel rows.

15. The method of claim 12, wherein the first read-out area of the detector includes a first set of the plurality of pixel rows and a first set of the plurality of pixel columns, and the method further comprising:
adjusting a size of the second read-out area by decreasing a number of pixel rows in the second read-out area to a reduced set of pixel rows that is less than the first set of pixel rows, wherein the second rate is faster than the first rate based in part on the reduced set of pixel rows.

16. The method of claim 12, wherein the first read-out area of the detector includes a first set of the plurality of pixel rows and a first set of the plurality of pixel column, and the method further comprising:

adjusting a size of the second read-out area by decreasing a number of pixel columns in the second read-out area to a reduced set of pixel columns that is less than the first set of pixel columns, wherein the second rate is faster than the first rate based in part on the reduced set of pixel columns.

17. The method of claim 12, wherein the first read-out area of the detector includes a first set of the plurality of pixel rows and a first set of the plurality of pixel columns, and the method further comprising:

adjusting a size of the second read-out area by increasing a number of pixel rows in the second read-out area to an increased set of pixel rows that is greater than the first set of pixel rows, wherein the second rate is slower than the first rate based in part on the increased set of pixel rows.

18. The method of claim 12, wherein the first read out-area of the detector includes a first set of the plurality of pixel rows and a first set of the plurality of pixel columns, and the method further comprising:

adjusting a size of the second read-out area by increasing a number of pixel columns in the second read-out area to an increased set of pixel columns that is greater than the first set of pixel columns, wherein the second rate is slower than the first rate based in part on the increased set of pixel columns.

19. The DCA of claim 1, wherein the DCA is part of a head-mounted display.

* * * * *